(12) United States Patent
Chevallier et al.

(10) Patent No.: US 8,488,014 B2
(45) Date of Patent: Jul. 16, 2013

(54) METHOD OF CREATING AND REPRODUCING A PANORAMIC SOUND IMAGE, AND APPARATUS FOR REPRODUCING SUCH AN IMAGE

(75) Inventors: Louis Chevallier, La Meziere (FR); Lionel Oisel, La Nouaye (FR); Jean-Ronan Vigouroux, Rennes (FR)

(73) Assignee: Thomson Licensing (FR)

( * ) Notice: Subject to any disclaimer, the term of this patent is extended or adjusted under 35 U.S.C. 154(b) by 287 days.

(21) Appl. No.: 12/451,580

(22) PCT Filed: May 27, 2008

(86) PCT No.: PCT/EP2008/056516
§ 371 (c)(1),
(2), (4) Date: Aug. 30, 2010

(87) PCT Pub. No.: WO2008/145661
PCT Pub. Date: Dec. 4, 2008

(65) Prior Publication Data
US 2010/0321512 A1 Dec. 23, 2010

(30) Foreign Application Priority Data
May 29, 2007 (FR) ................................. 07 55314

(51) Int. Cl.
*H04N 5/225* (2006.01)
*H04N 5/222* (2006.01)
*H04N 5/262* (2006.01)
*H04N 9/80* (2006.01)
*H04N 5/93* (2006.01)
*H04B 1/00* (2006.01)
*G06K 9/32* (2006.01)
*G06F 3/16* (2006.01)

(52) U.S. Cl.
USPC ............. 348/218.1; 348/333.12; 348/333.05; 348/239; 386/241; 386/278; 381/119; 382/294; 382/284; 715/727; 715/728

(58) Field of Classification Search
USPC ................... 348/239, 218.1, 333.01–333.12, 348/36, 218; 715/727, 728, 730, 716; 704/278, 704/208, 214; 381/27, 119; 700/94; 386/241, 386/201, 278, 308; 382/276, 284, 293, 294; 345/427, 428, 629, 640, 660
See application file for complete search history.

(56) References Cited

U.S. PATENT DOCUMENTS
7,415,120 B1 * 8/2008 Vaudrey et al. ............... 381/109
(Continued)

FOREIGN PATENT DOCUMENTS
WO WO 2007/038198 4/2007

OTHER PUBLICATIONS
Search Report Dated Jul. 29, 2008.

*Primary Examiner* — Nhan T Tran
*Assistant Examiner* — Marly Camargo
(74) *Attorney, Agent, or Firm* — Jack Schwartz and Associates, PLLC

(57) ABSTRACT

The present invention relates to a method to create and reproduce a panoramic sound image. Initially, there is a plurality of images associated with sound sequences, these images are for example taken using a camera, this camera having recorded the ambient sound at the time of taking the photograph. The ambient sound is then filtered to keep only the stationary component. Then, the images are concatenated to form a unique image called "panoramic", each sound sequence being associated with a part of the panoramic image containing the image associated with this sequence. Finally, the commands are introduced to display the parts of the panoramic image. The command also enables to reproduce continually the stationary component of at least a sound content associated with at least a displayed part of the panoramic image. According to an improvement, the sound sequence is reproduced continually until the introduction of a new command.

Figure 1A:
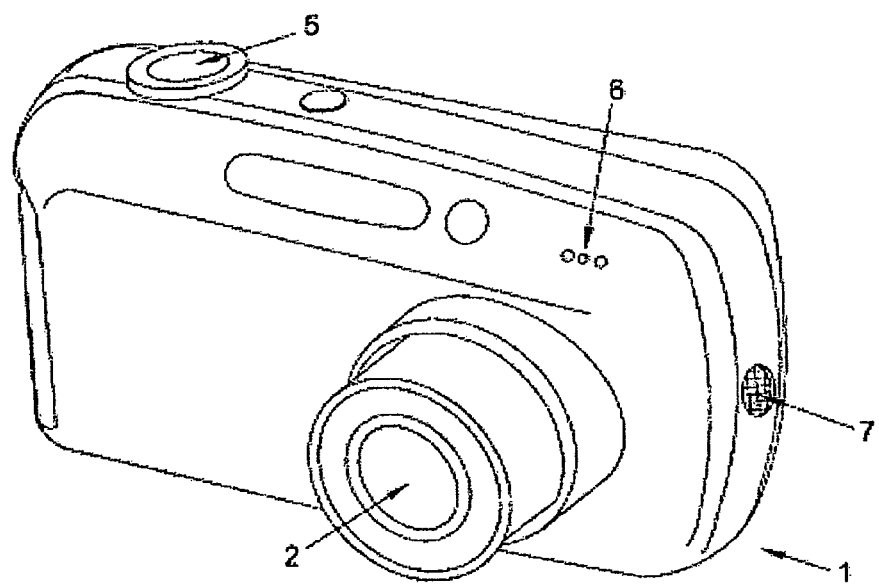

The invention also relates to a reproduction device enabling the reproduction of a panoramic image and a sound sequence.

11 Claims, 4 Drawing Sheets

U.S. PATENT DOCUMENTS

| | | |
|---|---|---|
| 2002/0075295 A1 | 6/2002 | Stentz et al. |
| 2003/0193606 A1 | 10/2003 | Driscoll, Jr. et al. |
| 2006/0120624 A1 * | 6/2006 | Jojic et al. ..................... 382/284 |
| 2006/0159445 A1 | 7/2006 | Ono et al. |

* cited by examiner

METHOD OF CREATING AND REPRODUCING A PANORAMIC SOUND IMAGE, AND APPARATUS FOR REPRODUCING SUCH AN IMAGE

This application claims the benefit, under 35 U.S.C. §365 of International Application PCT/EP2008/056516 filed May, 27, 2008, which was published in accordance with PCT Article 21(2) on Dec. 4, 2008 in French and which claims the benefit of French patent application No. 0755314, filed May 29, 2007.

FIELD OF THE INVENTION

The invention relates to a method for creation and reproduction of a panoramic sound image, and a device for the implementation of the method.

DESCRIPTION OF RELATED ART

Numerous models of digital photo devices are currently on the market. The image is projected in the device onto a CCD or CMOS sensor, converted into digital data and stored in a memory. Using digital technology, the user takes a photograph and can see it immediately after on a small screen generally situated on the back side of the device. The user verifies the quality of the image displayed and decides either to keep the photograph by memorizing it in a removable support, or to delete it.

Some devices have CCD or CMOS sensors sufficiently rapid to record a video sequence. The user can thus film an animated scene centered on characters, or even record a panoramic animation by rotating himself. Due to the limited power to rapidly encode images and the memory capacity of the camera, the images of the sequence have a lower resolution than non-animated images. These devices also have a microphone to capture the audible environment during the recording of the video sequence. During the reproduction of the video sequence, the sound recorded at the same time as the images can be heard.

The digital data of the sequence comprising a video and audio component are incorporated in a file that can be transferred to a computer or engraved on a CD-ROM. The images of the audiovisual sequence can thus be reproduced on a screen and the sound is transmitted to the loudspeakers. In this way, the user can see and hear what he has filmed with his camera. Due to the low resolution of the images taken at the time of recording, the reproduction quality is not excellent especially if the images are viewed on a large sized screen or using a video projector.

The document WO 2007/038198 filed by KODAK and published 5 Apr. 2007 describes a camera having a microphone. According to an operating mode, a sound sequence is associated with an image, with duration of three seconds. In the operating mode "stitched panoramic capture mode" photographs are placed end to end to form a panoramic photo. The audio sequences taken for each image are reproduced during the display of associated images. If the panoramic image is completely displayed, a visual indication informs of the identity of the reproduced sound sequence.

The document US 2002/075295 published 20 Jun. 2002 describes a panoramic camera having two microphones, the camera records the images and sound received by the two microphones and associates a sound with a direction.

The document US 2002/0063709 published on May 30, 2002 describes the reproduction of a panoramic image and a system for recording more than one audio track. When the panoramic image is reproduced, the sound recorded on a track is constantly reproduced.

The document US 2003/0193606 published the 16 Oct. 2003 describes the possibility to record from several microphones, so as to have a three dimensional acoustic yield. The reproduction is carried out according to the angle that the user has selected.

Also known are image presentation applications enabling association of a sound with an image. The images scroll on the screen automatically or manually and at each image display, the associated sound is reproduced. But these images are selected manually and have not necessarily links with one another, consequently their reproduction one after another does not always procure a good visual effect.

There is therefore a real need to improve the quality of a graphical animation composed of more than one images while reproducing a sound content adapted to what is currently displayed.

BRIEF SUMMARY OF THE INVENTION

The purpose of the invention is a method for reproduction of a panoramic sound image comprising a step of definition of an ordered list of a plurality of images, each image being associated with a sound content, characterized in that it also comprises:
  a step of filtering of the sound content of each image so as to conserve only the stationary component,
  a step of concatenation of images in the order defined so as to create a unique image called "panoramic" each sound content being associated with a part of the panoramic image containing the image associated with this content,
  a step of introduction of a command displaying a part at least of a panoramic image thus created, the command also triggering a step of continuous reproduction of a stationary sound component associated with at least a displayed part of the panoramic image.

In this way, a part of the panoramic image thus created can be displayed and an audio content adapted to the displayed part is reproduced. When the user introduces a command enabling modification of the part of the image, he no longer needs to carry out manually the association with the sound content. When it is displayed, the reproduction of the sound sequence improves the visualization of the image. The step of reproduction of the sound content is carried out continually while the panoramic image associated with the content is displayed. In this way, the user can remain a long time on a same part of the image; he continually hears the associated sound sequence.

According to an improvement, the sounds representative of spoken language are filters from the end of the first occurrence. The filtering is carried out while maintaining the sounds stationary, in this way the short sounds will be attenuated and in certain favorable cases, deleted. In this way, the user hears the first time what is said but then only the background noise is reproduced.

According to another improvement, the step of concatenation comprises a step of elaboration of a part of the panoramic image, this part placed between two images has characteristics specific to the two images situated with respect to one another so as to show a visual transition. In this way, the left side of the displayed right part and the right side of the displayed left part are merged so as to present a fluid and agreeable transition to the user. According to another improvement, the data of each image are downloaded to a device other than that producing the images. This device executes the steps of sound concatenation, display and reproduction. In this way, the downloaded images can be reproduced in any reproduction device.

According to another improvement, if two parts of the panoramic image are displayed then the two sound contents associated with these two parts are mixed, the sound level of content depending on the proportion displayed of the associated part. In this way, the reproduction between the two sequences respects the distribution between the two image parts displayed. According to another improvement, the sound contents associated with the panoramic image parts are stereophonic, the step of reproduction consists in reproducing the left or right track of the sound content according to the presence on the display of the left or right part of the associated panoramic image part. In this way, the reproduction between the two sequences respects the respective positions on the screen of the two image parts displayed. According to another improvement, the images are photographs taken by a camera, the step of definition of the ordered list consists in selecting the order of photographs taken by said camera. In this way, the user no longer needs select individually the images and define the order of concatenation, the camera does this itself.

The purpose of the present invention is also a reproduction device comprising a means for memorization of data of a plurality of images and a plurality of sound contents each associated with an image, a means of introduction of command enabling defining of an ordered list of images, a display means and a means of sound reproduction, characterized in that it comprises a means of filtering of the sound content of each image in such a way as to only conserve the stationary component, a means of concatenation of images in a predefined order to create a unique image called "panoramic", each sound content being associated with a part of the panoramic image containing the image associated with this content, the means of introduction of a command triggering the display of a part of the panoramic image and the continuous reproduction of a stationary component of at least a sound content associated with at least a displayed part of the panoramic image.

BRIEF DESCRIPTION OF THE DRAWING FIGURES

Figure 1B:
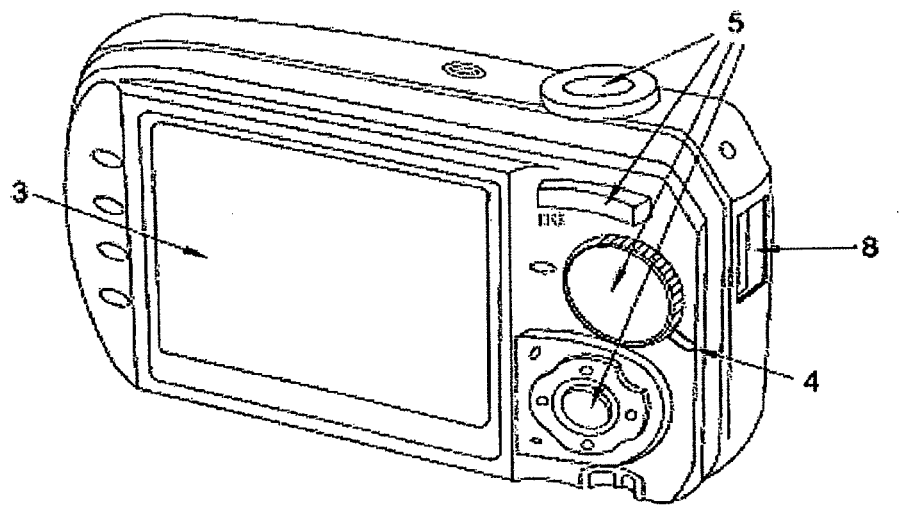
Figure 2:
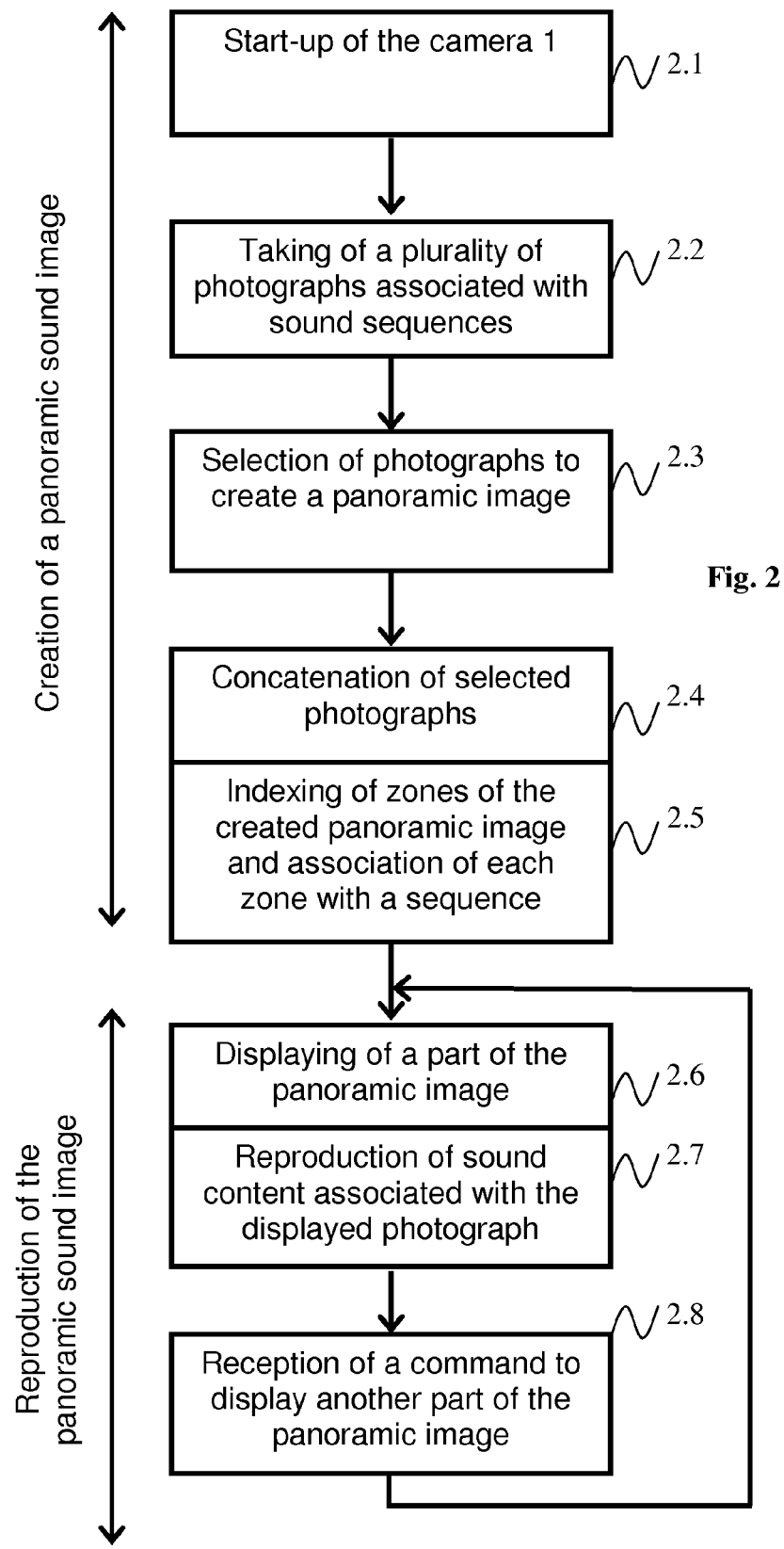
Figure 3:
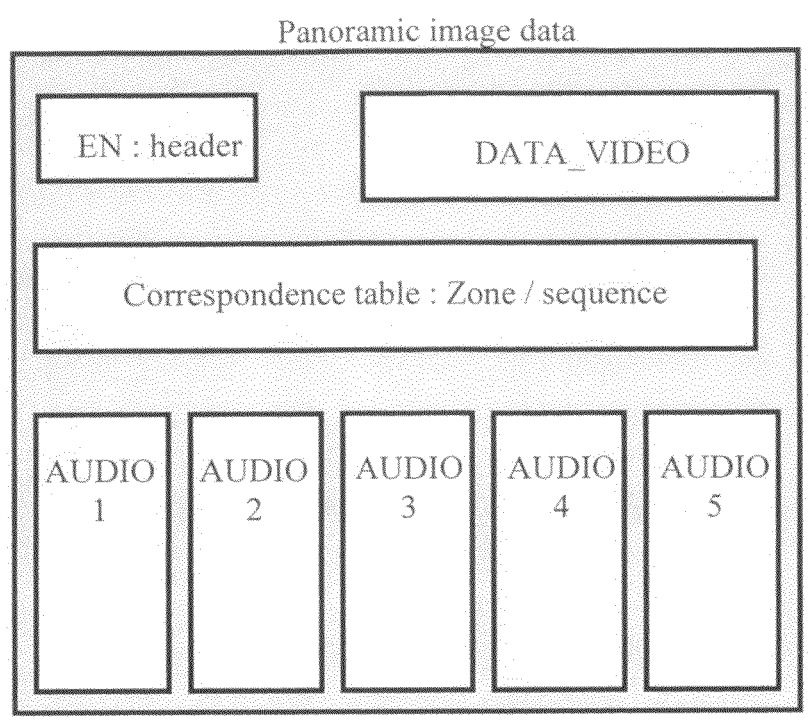
Figure 4:
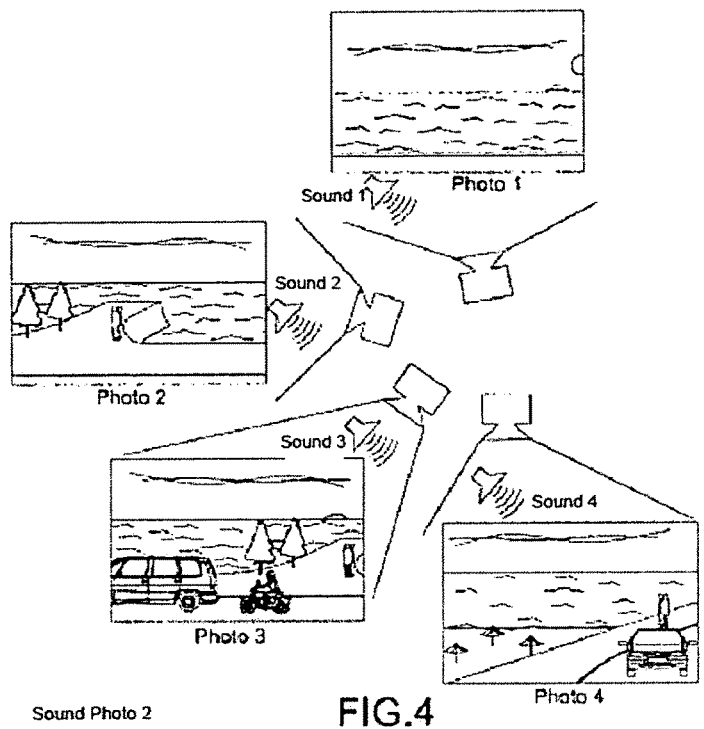

Other characteristics and advantages of the invention will now emerge with more details, within the scope of the description that follows, of embodiments given as an example by referring to the figures attached wherein:

FIGS. 1a and 1b represent a front view and a rear view of a camera for the implementation of an embodiment of the invention, FIG. 2 is an example of a flow chart of the main stages carried out for the implementation of the method of the invention, FIG. 3 shows a schema of the content of the memory containing the panoramic image created according to an embodiment of the invention, FIG. 4 shows the correlations existing between the images taken independently of one another and the panoramic image from the fusion of the initial images.

Figure 5A:
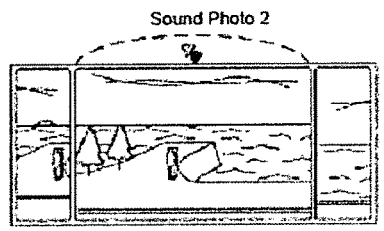
Figure 5B:
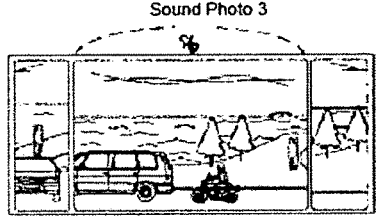
Figure 5C:
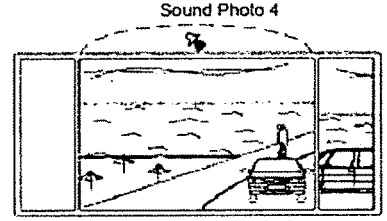

FIGS. 5a, 5b and 5c show the screen appearances and the sound contents reproduced when the user introduces navigation commands.

DETAILED DESCRIPTION OF THE INVENTION

First will be described the functioning of a digital camera 1, as shown in FIGS. 1a and 1b. The FIGS. 1a and 1b show a front view and a rear view of a camera according to an embodiment of the invention. We will first list the main elements enabling the implementation of the present invention.

Externally, the digital camera 1 comprises an objective 2, a screen 3 of LCD or OLED technology, a memory module possibly removable 4 and buttons 5 for settings and shot taking. The buttons enable the camera 1 to be set to "shot taking" mode" where the screen 3 visualizes the image detected by the CCD sensors, or in reproduction mode of memorized contents where the images recorded in the memory module 4 are displayed on the screen 3. Generally, the photographic device 1 has buttons for navigation, specifying four directions: up, down, left and right. According to some models, the commands are accessible via icons displayed on the screen. An icon is highlighted and the associated function is executed by pressing the "OK" key. The camera 1 has numerous shot taking modes including that enabling the recording of a panoramic image with its sound environment, called "Panoramic sound photo". The recording of the sound environment is carried out using a microphone 6 on the front side of the camera. Advantageously, the microphone is directional, for example of cardioid type in the camera, recording the sound in the direction of the shot. In this way, only the sounds coming from objects taken in photos are recorded, and will later be restored. The camera 1 also has a small loudspeaker 7 placed on the side. When the user sets his camera to content reproduction mode, a video document is associated with a sound sequence, this latter is reproduced via the loudspeaker 7.

The camera 1 also comprises a connector 8 that enables the transmission of sound and visual contents to a portable computer. Typically, the communications is enabled via a USB link. The photos are recorded in the files that are transferred to the computer. The user can thus see his photos on a big screen and listen to the sound contents via loudspeakers connected to the computer.

After having detailed the main components of an example of the device for the implementation of the invention, it will be explained how these components cooperate.

The flow chart of FIG. 2 describes the progression of the main steps for the implementation of the method according to an embodiment of the invention. The steps are broken down into two groups, one enables the creation of the panoramic sound image, and the other group enables the reproduction of a panoramic sound image. It will be understood that the steps of each group can be executed in separate devices.

In step 2.1, the user starts-up his camera 1, the objective 2 is extracted from its compartment and if the device is in the mode "Photo sound" the screen displays the image captured by the objective 2. If it was not already done at the start-up, the user configures his device by selecting via a button the operating mode "Photo sound". In this operating mode, the device 1 waits for the first press on the shutter button. When taking sound photography, the camera 1 records an ambient sound sequence using the microphone 6 (step 2.2). Advantageously, the duration of the recording of the sound sequence can be set via the initialization menu. The sound is converted into a digital format and constitutes a data packet that is associated with the visual data, the whole constituting an image file. The user then takes other photos that constitute so many image files that are memorized in the memory 4 of the camera.

According to a simple embodiment, at step 2.3, the user himself selects the photo files enabling the realization of a panoramic sound image. This selection can be made at the level of the camera 1 using a data configuration menu, or at the level of a computer in which the image files have been downloaded. In the first case, the user activates the option "Assembly of a panoramic image" all of the memorized images then appear in the form of thumbnails. The user selects in a determined order, the first image then the second and so on until the last. The images are concatenated one beside the other to form a panoramic image, for example the left side of a first image touching the right side of the next image. A variant for the development of the order for concatenation of images consists in implementing in the camera 1 a specific mode called "panoramic image". While the camera is in this mode, the order in which photos are taken defines the concatenation order. For example, the user activates this mode, takes a plurality of photographs turning him to a certain angle and terminates the acquisition of the series of photographs by quitting the mode. All the photographs of the series are then automatically used by the camera to produce a panoramic sound image.

Step 2.4 consists in producing data of the panoramic sound image. There are numerous techniques for the creation of panoramas from more than one image. Most of them require the existence of common zones between images to be readjusted. Consider two images to be assembled. Image 1 is taken as the reference image.

The first step consists in estimating the deformation to apply to the common zone of image 2 so that it perfectly overlaps onto image 1. To do this, a method can be used based on the points of interest that consists in an extraction of singular points in the image 1 and the image 2, followed by a placing in correspondence of these points between the two images. From this set of points in correspondence, it is possible to calculate the model of deformation of the common zone. This model is then used to overlap the whole of image 2 onto image 1. This process is iterated on all the images in order to obtain the final panorama (step 2.4). At step 2.5, the panopramic image created is divided into parts corresponding to each photograph used for the final assembly. Each part is a zone referenced by cartesian coordinates that is associated with the sound sequence produced at the moment when the photograph corresponding to this part was taken. Thus, each zone becomes an index enabling initial sound images to be found again and thus create correspondence between such a part of the panoramic image with the corresponding sound sequence. FIG. 3 shows the different elements of the panoramic sound image:

a header EN,
 a block of visual data constituting the assembled panoramic image: DATA_VIDEO
 a correspondence table associating the parameters defining a zone of the panoramic image with a sound sequence: TABLE,
 a plurality of "i" sound sequences noted as "AUDIO_i" associated with the coordinates "COORD_j" of "i" zones each corresponding to a part of the panoramic image AUDIO i.

The panoramic sound image thus created is then transferred and/or memorized either in the device 1, or in a computer or other audiovisual reproduction device.

At step 2.6, the file content is processed in order to reproduce the panoramic sound image. If the reproduction is carried out by the camera 1, the displayed part of the panoramic image is displayed on the screen 3 and the sound sequence associated with the photograph is displayed on the screen and reproduced by the loudspeaker 7 (step 2.7). The right part of the panoramic image is displayed first on the display means (computer or television screen, video-projector, PAD LCD screen, etc.) and the sound corresponding to this image part is reproduced. The reproduction can also be carried out in a device onto which the panoramic sound image file has been downloaded. At step 2.8, the user introduces a displacement command of the display window to display other parts of the panoramic image. If the reproduction is carried out at the level of the device 1, the commands are introduced by pressing the left or right keys. At any moment, the displayed part is compared with the zones referenced by the coordinates COORD_i in order to determine the part that appears the most or the most at the centre of the display window. Once this zone has been determined, the corresponding sound sequence is extracted from the panoramic sound image data and reproduced. In this way, the panoramic image is restored with the sound environment corresponding to the viewpoint angle of the part of the image currently displayed. The user thus navigates both in an image and in a sound environment that change according to his commands.

FIG. 4 shows the taking of four photographs at different angles. In the example the user is in an old building by the water's edge, and has taken photographs from the same area each time performing a small rotation. The photograph 1 shows the sea and the sound associated are the sound of waves. The photograph 2 shows the sea and on the left an embankment giving onto a boulevard that extends into the distance, a part of the beach can also be seen and conversations of persons close to the camera can be heard. The photograph 3 shows cars on the boulevard and the sound sequence records the sound of traffic and car horns. The photograph 4 shows another view of the boulevard with on the left a bit of the beach, the sound sequence associated contains the sound of traffic and a conversation. The panoramic image will realize a fusion of these four photographs as if the camera was equipped with a very wide viewing angle. Then, during the visualization of this panoramic image, the sound sequence selected to be reproduced is that associated with the photograph displayed.

FIGS. 5*a*, 5*b* and 5*c* present three screen appearances when the user introduces the navigation commands. FIG. 5*a* shows photograph 2 at the centre of the screen and the parts of the adjoining photographs, the left part of photograph 1 appears on the right and the right part of photograph 3 appears on the left. At this time, the reproduced sound corresponds to photograph 2. Then the user introduces a left rotation command and the screen appearance of FIG. 5*b* is displayed. The photograph 3 then appears with a part of photograph 2 on the right, and a part of photograph 4 on the left. The reproduced sound is then that of photograph 3. Then the user introduces a new left rotation command and the screen appearance of FIG. 5*c* is displayed. Photograph 4 is at the centre of the displayed image and the left part of photograph 3 appears on the right. The white zone appearing on the left thus indicates to the user that he has arrived at the extremity of the panoramic image. If he continues to turn, the white zone will fill the whole screen from the left, then in continuing to turn photograph 1 will little by little appear from the right. A fine black line can also be displayed to materialize the extremity of the panoramic image, in this way, the user can see both the first and last photographs of the panoramic image on the screen.

According to an improvement, the sound sequence is reproduced indefinitely. According to a first variant, only the stationary part of the recorded sound is reproduced, the method then extracts its spectral and synthesis characteristics in order to reproduce a continuous sound. The feat of reproducing in a loop a stationary sound avoids perceiving the transition between the end of the sound sequence and its beginning. For example, if a part of the panoramic image corresponds to a view of the sea, the user can continually extend the sound of the waves. According to an improvement, the panoramic sound image reproduction device has a means of filtering the speech sequences. At the first reproduction loop, the set of sound data is reproduced, then for the next loops as long as the user introduces no new commands, the speech is filtered. According to this improvement, the sound sequence is recorded and it is at the moment of its reproduction that the stationary part is filtered, more specifically during the second reproduction of the sound sequence. In this way, when the image remains displayed a moment on the screen, it is the background noise that is finally reproduced (waves, wind, traffic sounds, gulls crying, etc.) Speeches that can be truncated and very disagreeable to hear repeatedly are not reproduced continually.

According to an improvement, the sound sequences associated with photographs are mono-phonic, and a mixing of two sound sequences is carried out when two associated photographs are reproduced on the screen in their totality or in part. Generally, the sound level of a sequence depends on the proportion displayed of the corresponding photograph.

According to another improvement, the recording of the sound sequence is made in stereo. To do this, the device 1 has two microphones to cover the left and right sides of the object taken by the photograph. If the panoramic image reproduction device has sound reproduction equipment, the left soundtrack reproduces the sounds of the left audio recording, likewise for the right soundtrack, when the displayed part of the panoramic image corresponds to an identified photograph. When the user operates a translation of the panoramic image and the parts of the two photographs are displayed, the device will reproduce the sound according to the framing. In this case, the left soundtrack reproduces the sounds of the right audio recording associated with the photograph displayed on the left, the right soundtrack reproduces the left audio recording associated with the photograph displayed on the right. Advantageously, a mixing operates between the left and right soundtracks associated with two photographs that have a common visual part.

According to an operating variant, the user can organize the assembly of the panoramic image at the time of taking the sound photographs. In this case, the sound photographs are numbered according to the order in which they are taken and the panoramic image is created in assembling the photos in this order. The camera 1 has a specific mode enabling an ordered series of photographs taken one after another to be associated. The user ends the acquisition of the series of photographs constituting the panoramic image by turning off the camera, or by changing the mode. This variant suppresses step 2.3 of manual assembly of images and enables a panoramic sound image to be obtained directly. The camera can then create the panoramic sound image internally or transmit the photographs with their shot numbers to an exterior device that is charged with doing the concatenation to create the panoramic sound image.

While the present invention was described in reference to particular illustrated embodiments, said invention is in no way limited to these embodiments, but only by the appended claims. It will be noted that any navigation means equivalent to the direction keys may be applied for the implementation of the invention. It is also noted that any images, not only of photographic origin can be used to create a panoramic image.

The invention claimed is:

1. A method for reproduction of a panoramic sound image comprising:
   a step of definition of an ordered list of a plurality of images, each image being associated with a sound content, and
   a step of concatenation of images in the order defined so as to create a unique image called "panoramic", each sound content being associated with a part of the panoramic image containing the image associated with this content,
   wherein the method also comprises a step of introduction of a command displaying a part at least of a panoramic image thus created,
   the command also triggering a step of continuous reproduction of the sound content at the time of the displaying of the part of associated image, the sound content being entirely reproduced at the first occurrence, and
   at the next occurrences, a filtering step of short sounds is applied to the sound content in the view of keeping only a stationary sound, and
   wherein if two parts of the panoramic image are displayed then the step of reproduction comprises the mixing of two stationary components of sound contents associated with these two parts to produce a monophonic sound, the sound level of each of the stationary components depending on the displayed proportion of the associated part.

2. The method for reproduction according to claim 1, wherein the step of filtering of short sounds deletes the sounds representative of spoken language.

3. The method for reproduction according to claim 1, wherein the step of concatenation comprises a step of elaboration of at least a part of the panoramic image placed between two images having characteristics specific to these two images so as to show a visual transition.

4. The method for reproduction according to claim 1, wherein it comprises a step of downloading of data of each image into a device other than that producing the images, this other device executing the steps of concatenation, display and sound reproduction.

5. The method for reproduction according to claim 1, wherein the sound contents associated with the parts of the panoramic image are stereophonic, the step of reproduction continues selecting the stationary component of a left or right soundtrack of the sound content according to the presence on the display of a left or right part of the part of the associated panoramic image.

6. The method for reproduction according to claim 1, wherein the sound contents associated with the parts of the panoramic image are stereophonic, if parts of two images are displayed then the stationary component of a left soundtrack of the right image is reproduced on a right soundtrack, and the stationary component of a right soundtrack of the left image is reproduced on a left soundtrack.

7. A reproduction device comprising:
   a means for memorization of data of a plurality of images and a plurality of sound contents each associated with an image,
   a means of introduction of command enabling defining of an ordered list of images,
   a display means,
   a means of sound reproduction, and
   a means of concatenation of images in a defined order to create a unique image called "panoramic", each sound content being associated with a part of the panoramic image containing the image associated with this content,
   wherein the means of introduction of a command triggers the display of a part of the panoramic image and the continuous reproduction of the sound content at the time of the displaying of the part of associated image, the sound content being entirely reproduced at the first occurrence, and at the next occurrences, a filtering means deletes short sounds of the sound content in the view of keeping only a stationary sound, and wherein if two parts of the panoramic image are displayed then the means of reproduction mixes of two stationary components of sound contents associated with these two parts and produces a monophonic sound, the sound level of each of the stationary components depending on the displayed proportion of the associated part.

8. The reproduction device according to claim 7, wherein the means of filtering of short sounds deletes the sounds representative of spoken language.

9. The reproduction device according to claim 7, wherein the means for concatenation creates at least a part of the panoramic image placed between two images having characteristics specific to these two images so as to show a visual transition.

10. The reproduction device according to claim 7, wherein the sound contents associated with the parts of the panoramic image are stereophonic, the means of reproduction selecting the stationary component of a left or right soundtrack of the sound content according to the presence on the display of a left or right part of the part of the associated panoramic image.

11. The reproduction device according to claim 7, wherein the sound contents associated with the parts of the panoramic image are stereophonic, if parts of two images are displayed then the stationary component of a left soundtrack of the right image is reproduced on the right soundtrack, and the stationary component of a right soundtrack of the left image is reproduced on the left soundtrack.

* * * * *